(12) United States Patent
Kaneda et al.

(10) Patent No.: US 8,359,072 B2
(45) Date of Patent: Jan. 22, 2013

(54) MOBILE TERMINAL HAVING FLOATED DISPLAYING UNIT

(75) Inventors: Yasuhisa Kaneda, Tokyo (JP); Jongseong Lee, Tokyo (JP); Yuzuru Masuda, Tokyo (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 12/276,830

(22) Filed: Nov. 24, 2008

(65) Prior Publication Data

US 2009/0137283 A1 May 28, 2009

(30) Foreign Application Priority Data

Nov. 27, 2007 (KR) .................... 10-2007-0121543

(51) Int. Cl.
*H04M 1/00* (2006.01)
(52) U.S. Cl. ..................... 455/566; 455/575.1
(58) Field of Classification Search ............... 455/575.4, 455/575.3, 575.1, 566
See application file for complete search history.

(56) References Cited

U.S. PATENT DOCUMENTS

| 6,539,208 | B1* | 3/2003 | Mori ......................... 455/575.3 |
| 2002/0094846 | A1* | 7/2002 | Kishimoto et al. ........... 455/566 |
| 2004/0203527 | A1* | 10/2004 | Matsumoto ................. 455/90.3 |
| 2005/0124394 | A1* | 6/2005 | Kim et al. .................. 455/575.3 |
| 2009/0117955 | A1* | 5/2009 | Lo .............................. 455/575.3 |

\* cited by examiner

*Primary Examiner* — Lincoln Donovan
*Assistant Examiner* — Shikha Goyal
(74) *Attorney, Agent, or Firm* — H.C. Park & Associates, PLC

(57) ABSTRACT

A mobile terminal having a floated display unit is provided. The mobile terminal includes a first body unit having a first surface and a second surface opposite to the first surface, a second body, and a hinge unit. The second body unit is shorter than the first body unit, is disposed in a central part of the first surface of the first body unit, and has a first display unit disposed in a first surface of the second body unit opposite to a second surface of the body unit facing the first surface of the first body unit. The hinge unit connects the first body unit and the second body unit. The second body unit is movable about the hinge unit to open/close the second body unit with respect to the first surface of the first body unit.

9 Claims, 3 Drawing Sheets

MOBILE TERMINAL HAVING FLOATED DISPLAYING UNIT

CROSS REFERENCE TO RELATED APPLICATION

This application claims priority from and the benefit of Korean Patent Application No. 10-2007-0121543, filed on Nov. 27, 2007, which is hereby incorporated by reference for all purposes as if fully set forth herein.

BACKGROUND OF THE INVENTION

1. Field of the Invention

The present invention relates to a mobile terminal having a floated display unit, and more particularly, to a mobile terminal having a display unit that appears to be floated forward.

2. Discussion of the Background

Nowadays, a mobile terminal has become an important necessity in daily living. According to the technical developments of a mobile terminal, the mobile terminal may provide voice information, message information, image information, MP3 services, games, and digital broadcasting information to a user. The user may confirm the information through a display unit of the mobile terminal.

In a conventional folder type or a slide type mobile terminal, since the length of a first body unit is almost the same as that of a second body unit, a display unit may appear planar. Thus, an image displayed on the display unit may not be floated or distinguished, which may deteriorate viewing efficiency.

In such a mobile terminal, a speaker may be used for digital broadcasts, moving pictures, or MP3 services.

However, the speaker in the conventional folder type or slide type mobile terminal may be installed in a side or rear surface of the mobile terminal. Accordingly, when viewing digital broadcasts or moving pictures on a display unit of the mobile terminal, sound may be output through the side or rear surface of the mobile terminal, which may limit the ability of the mobile terminal to provide a user with high quality sound.

SUMMARY OF THE INVENTION

The present invention provides a mobile terminal having a floated display unit in which an image appears to be floated in front of a display unit.

The present invention also provides a mobile terminal having a floated display unit that may provide a user with high quality sound.

Additional features of the invention will be set forth in the description which follows, and in part will be apparent from the description, or may be learned by practice of the invention.

The present invention discloses a mobile terminal including a first body unit having a first surface and a second surface opposite to the first surface, a second body unit, and a hinge unit. The second body unit is shorter than the first body unit, is disposed in a central part of the first surface of the first body unit, and has a first display unit disposed in a first surface of the second body unit opposite to a second surface of the second body unit facing the first surface of the first body unit. The hinge unit connects the first body unit and the second body unit. The second body unit is movable about the hinge unit to open/close second body unit with respect to the first surface of the first body unit.

The present invention also discloses a mobile terminal including a first body unit, a speaker unit, a second body unit, and a hinge unit. The first body unit has a first region, a second region, and a third region. The second region is between the first region and the third region. The speaker unit includes a first speaker arranged in the first region and a second speaker arranged in the third region. The second body unit is disposed on the first body unit and the includes a first display unit. The hinge unit coupled the first body unit and the second body unit, and the second body unit is movable about the hinge unit. When the second body unit is in a first position, the second body unit is disposed in the second region only of the first body unit, the first display unit is exposed, and the first speaker and the second speaker are exposed at opposite sides of the second body unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
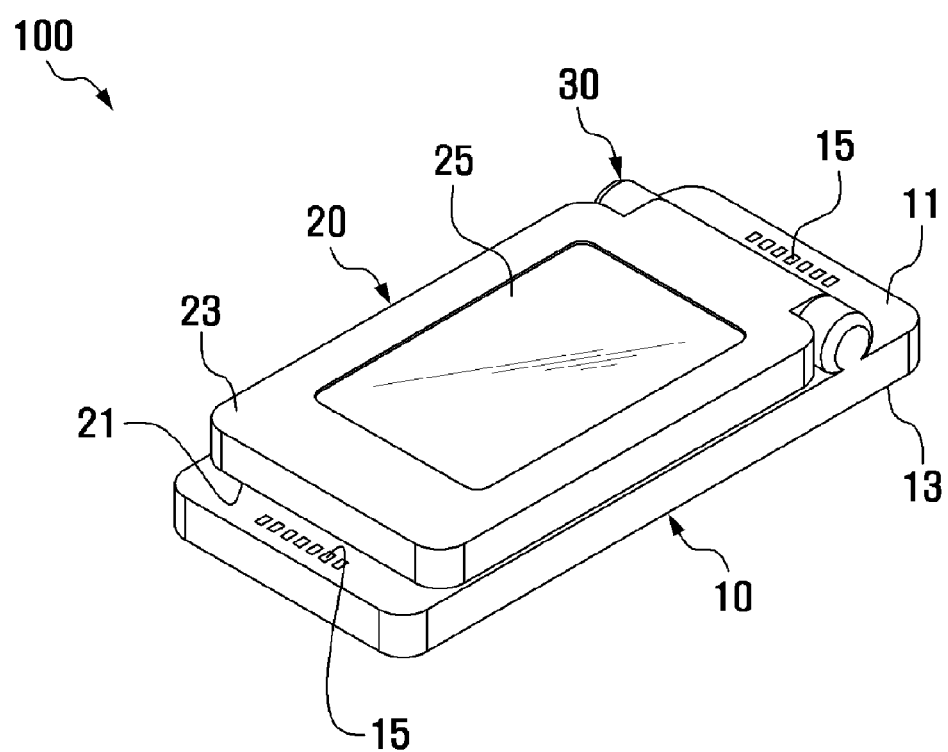
FIG. 1 is a perspective view showing a mobile terminal having a floated display unit according to a first exemplary embodiment of the present invention, with a second body unit being closed.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
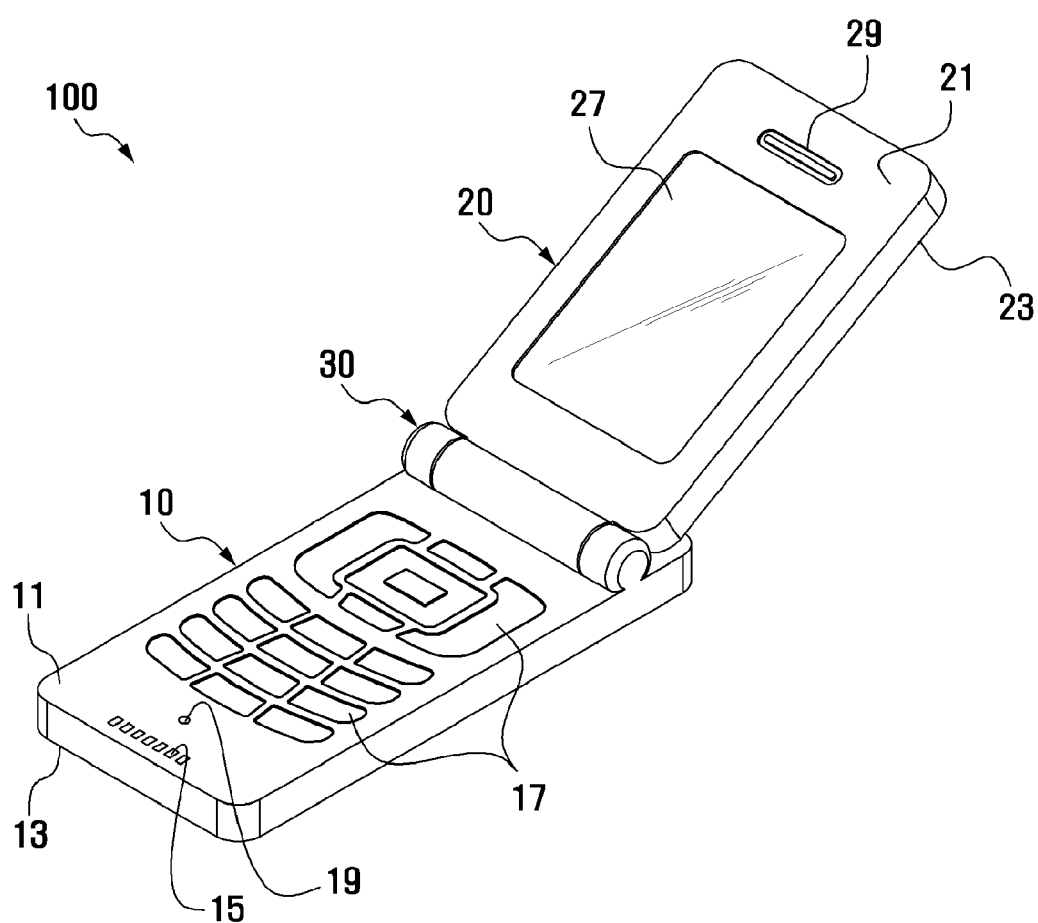
FIG. 2 is a perspective view showing the mobile terminal in FIG. 1, with the second body unit being opened.

A mobile terminal 100 according to a first exemplary embodiment of the present invention is a folder type mobile terminal, as shown in FIG. 1 and FIG. 2, and includes a first body unit 10, a second body unit 20, and a hinge unit 30. The first body unit 10 has an inside surface 11, an outside surface 13 facing the inside surface 11, and dual speakers 15 respectively installed in opposite end parts of the inside surface 11. The second body unit 20 is installed above the inside surface 11 of the first body unit 10 inside of the dual speakers 15, and has a first display unit 25 installed in an outside surface 23 opposite to an inside surface 21 facing the inside surface 11 of the first body unit 10. The hinge unit 30 connects the first body unit 10 and the second body unit 20, and opens/closes the second body unit 20 with respect to the first body unit 10. Here, the hinge unit 30 connects one end part of the second body unit 20 adjacent to one of the dual speakers 15 and one end part of the first body unit 10.

The dual speakers 15 of the first body unit 10 are installed outside of opposite end parts, that is, opposite short side edge parts of the first display unit 25. Thus, when a user wants to use the first display unit 25 in a landscape mode, a user may turn the mobile terminal 100. In this case, since the dual speakers 15 are positioned outside of the opposite end parts of the first display unit 25, the user may listen to high quality sound output through the dual speakers 15.

The first body unit 10 includes a keypad 17 and a microphone 19 that are installed in the inside surface 11 thereof. When the second body unit 20 is closed, the keypad 17 and the microphone 19 are covered by the second body unit 20, and thus, the keypad 17 and the microphone 19 are not exposed. When the second body unit 20 is opened, the keypad 17 and the microphone 19 are exposed.

The second body unit 20 includes a second display unit 27 installed in the inside surface 21 thereof. That is, the second body unit 20 has two display units 25 and 27. The second body unit 20 includes an earpiece 29 that is installed opposite to the hinge unit 30. In particular, the second body unit 20 is shorter than the first body unit 10 and is installed in a central part of the inside surface 11 of the first body unit 10, which provides a floating effect in which the first display unit 25 appears to float.

The two display units 25 and 27 may be liquid crystal displays (LCDs), however, other display devices such as active matrix organic light emitting diodes (AMOLEDs) may be used. The first display unit 25 installed in the outside surface of the mobile terminal 100 may have a relatively big screen and relatively good resolution, compared with the second display unit 27. For example, the first display unit 25 may be embodied as a large-sized quarter video graphics array (QVGA) LCD and the second display unit 27 may be embodied as a small-sized quarter common intermediate format (QCIF) LCD. However, the present invention is not limited thereto, and thus, the two display units 25 and 27 may have the same size and resolution.

The first display unit 25 may provide a multimedia mode to display a screen of multimedia functions such as digital broadcasts, moving pictures, or MP3 services; and the second display unit 27 may provide a communication mode to display a screen of typical functions such as communication. Further, when displaying a screen, the first display unit 25 may provide a landscape mode, and the second display unit 27 may provide a portrait mode. However, the two display units 25 and 27 are not limited to the above-described modes.

Screens of the two display units 25 and 27 are not turned on simultaneously. In other words, if one of the display units is turned on, the other may be turned off.

In particular, when the first display unit 25 is activated to perform a multimedia mode when the second body unit 20 is closed, the dual speakers 15 are activated. Accordingly, a user may watch an image displayed on the first display unit 25 and listen to high quality sound output through the dual speakers 15 installed outside of the opposite end parts of the first display unit 25.

Further, when the second display unit 27 is activated to perform a communication mode when the second body unit 20 is opened, the earpiece 29 and the microphone 19 are activated.

Since the second body unit 20 having the two display units 25 and 27 is installed in the central part of the first body unit 10, and the dual speakers 15 are exposed outside of the opposite end parts of the second body unit 20, the second body unit 20 may float or protrude with respect to the first body unit 10. Accordingly, when watching digital broadcasts or moving pictures on the first display unit 25, the user may focus on the first display unit 25.

Further, since the dual speakers 15 are arranged in the opposite end parts of the first body unit 10, the weight thereof may be stably distributed in the first body unit 10, and accordingly the user may stably manipulate the mobile terminal 100 while holding the mobile terminal 100.

As described above, since the second body unit 20 having the first display unit 25 is installed in the central part of the first body unit 10, and is shorter than the first body unit 10, the mobile terminal 100 according to the first exemplary embodiment of the present invention may provide a floating effect in which the first display unit 25 appears to float. Thus, the digital broadcasts or moving pictures displayed on the first display unit 25 may be distinct, and the user may focus on an image displayed on the first display unit 25.

Further, in the mobile terminal 100 according to the first exemplary embodiment of the present invention, since the dual speakers 15 are exposed in the same direction as the first display unit 25, an image display direction of the first display unit 25 and a sound output direction through the dual speakers 15 are the same. Accordingly, when the second body unit 25 is closed, the user can watch an image displayed through the first display unit 25 and listen to high quality sound output through the dual speakers 15, in the same direction.

Figure 3:
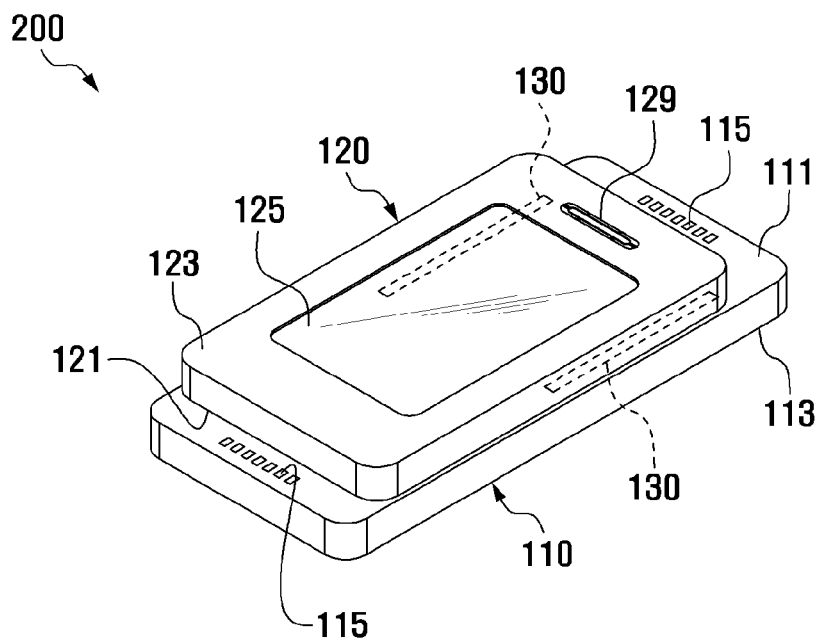
FIG. 3 is a perspective view showing a mobile terminal having a floated display unit according to a second exemplary embodiment of the present invention, with a second body unit being closed.
Figure 4:
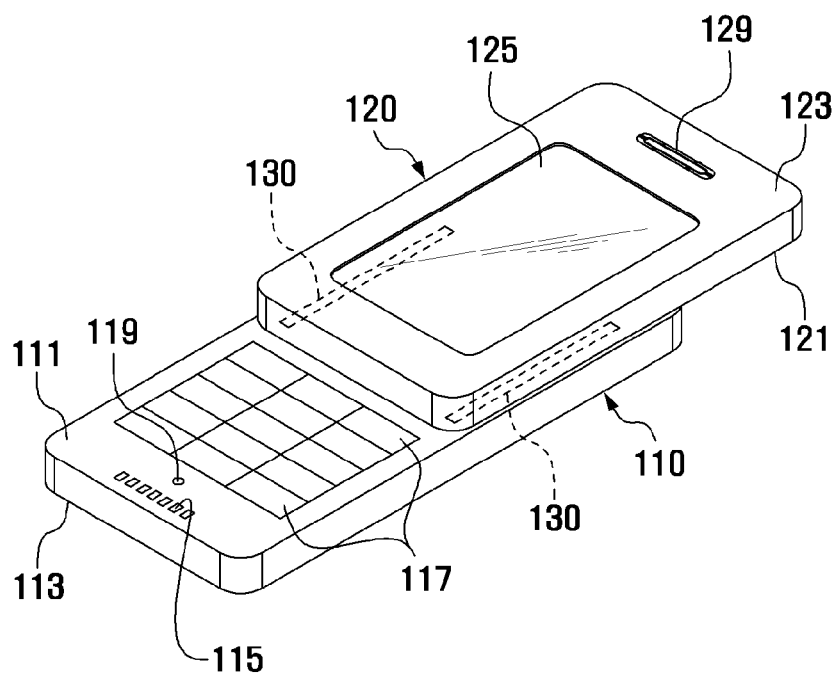
FIG. 4 is a perspective view showing the mobile terminal of FIG. 3, with the second body unit being opened.

A mobile terminal 200 according to a second exemplary embodiment of the present invention is a slide type mobile terminal, as shown in FIG. 3 and FIG. 4, and includes a first body unit 110, a second body unit 120, and a hinge unit 130. The first body unit 110 has an inside surface 111, an outside surface 113 opposite to the inside surface 111, and dual speakers 115 installed in opposite end parts of the inside surface 111. The second body unit 120 is installed above the inside surface 111 of the first body unit 110 inside of the dual speakers 115, and has a display unit 125 installed in an outside surface 123 opposite to an inside surface 121 facing the inside surface 111 of the first body unit 110. The hinge unit 130 connects the first body unit 110 and the second body unit 120, and opens/closes the second body unit 120 with respect to the first body unit 110. The hinge unit 130 has a sliding hinge to open/close the second body unit 120 by translating the second body unit 120 in a lengthwise direction of the first body unit 110.

Since the second body unit 120 having the display unit 125 is installed in a central part of the first body unit 110, and is shorter than the first body unit 110, the mobile terminal 200 according to the second exemplary embodiment of the present invention may provide a floating effect in which the display unit 125 appears to float. Accordingly, digital broadcasts or moving pictures displayed through the display unit 125 may be distinct, and thus, a user may focus an image displayed on the display unit 125.

Further, in the mobile terminal 200 according to the second exemplary embodiment of the present invention, since the dual speakers 115 are exposed in the same direction as the display unit 125, an image display direction on the display unit 125 and a sound output direction through the dual speakers 115 may be the same. Accordingly, when the second body unit 120 is closed, the user may watch an image displayed through the display unit 125 and listen to high quality sound output through the dual speakers 115, in the same direction.

The dual speakers 115 of the first body unit 110 are installed outside of opposite end parts, that is, opposite short side edge parts of the display unit 125. Thus, when a user wants to use the display unit 125 in a landscape mode, the user may turn the mobile terminal 200. In this case, since the dual speakers 115 are positioned outside of the opposite end parts of the display unit 125, the user may listen to high quality sound output through the dual speakers 115.

A keypad 117 and a microphone 119 are installed in the inside surface 111 of the first body unit 110. The keypad 117 and the microphone 119 are covered by the second body unit 120 and are not exposed when the second body unit 120 is closed. The keypad 117 and the microphone 119 are exposed when the second body unit 120 is opened.

The display unit 125 of the second body unit 120 is typically embodied as an LCD, however other display devices such as an AM OLED may be used. The second body unit 120 may include an earpiece 129 installed in an end part of the outside surface 123 thereof, outside of the display unit 125.

In particular, when the display unit 125 is activated to perform a multimedia mode when the second body unit 120 is closed, the dual speakers 115 are activated. Accordingly, the user may watch an image displayed through the display unit 125 and listen to high quality sound output through the dual speakers 115, in the same direction.

When the display unit 125 is activated to perform a communication mode in the state that the second body unit 120 is opened, the earpiece 129 and the microphone 119 are activated.

Since the second body unit 120 having the display unit 125 is installed in the central part of the first body unit 110 and the dual speakers 115 are exposed outside of the opposite end parts of the second body unit 120, the second body unit 120 may appear to float or protrude with respect to the first body unit 110. Accordingly, when watching digital broadcasts or moving pictures on the display unit 125, the user may focus on the display unit 125.

Since the dual speakers 115 are arranged in the opposite end parts of the first body unit 110, the weight thereof may be stably distributed in the first body unit 110, and accordingly, the user may stably manipulate the mobile terminal 200 when holding the mobile terminal 200.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
    a first body unit having a first surface and a second surface opposite to the first surface;
    a second body unit that is shorter than the first body unit, the second body unit being configured to be disposed in a central part of the first surface of the first body unit, the second body unit comprising a first display unit disposed in a first surface of the second body unit, wherein the first surface of the second body unit is opposite to a second surface of the second body unit, and wherein the second surface of the second body unit is configured to face the first surface of the first body unit; and
    a hinge unit configured to connect the first body unit and the second body unit, the hinge unit being further configured to enable the second body unit to be moved about the hinge unit to open/close the second body unit with respect to the first surface of the first body unit,
    wherein the second body unit further comprises a second display unit disposed in the second surface of the second body unit.

2. The mobile terminal of claim 1, wherein the first body unit comprises dual speakers respectively disposed in opposite end parts of the first surface of the first body unit outside of the second body unit.

3. The mobile terminal of claim 2, wherein the hinge unit is configured to connect one end part of the second body unit adjacent to one of the dual speakers and the first body unit.

4. The mobile terminal of claim 3, wherein the first body unit further comprises a keypad and a microphone that are disposed in the first surface of the first body unit and are covered by the second body unit, and the second body unit further comprises an earpiece that is disposed in the second surface of the second body unit another end part of the second body unit opposite to the hinge unit.

5. The mobile terminal of claim 4, wherein the dual speakers are configured to be activated when the first display unit is activated while the second body unit is closed.

6. The mobile terminal of claim 5, wherein the earpiece and the microphone are configured to be activated when the second display unit is activated while the second body unit is opened.

7. The mobile terminal of claim 1, wherein the first body unit further comprises a keypad and a microphone that are disposed in the first surface of the first body unit and are covered by the second body unit, and the second body unit further comprises an earpiece disposed in the first surface of the second body unit.

8. The mobile terminal of claim 2, wherein the dual speakers are configured to be activated when the first display unit is activated while the second body unit is closed.

9. The mobile terminal of claim 7, wherein the earpiece and the microphone are configured to be activated when the first display unit is activated while the second body unit is opened.

* * * * *

UNITED STATES PATENT AND TRADEMARK OFFICE
CERTIFICATE OF CORRECTION

| | |
|---|---|
| PATENT NO. | : 8,359,072 B2 |
| APPLICATION NO. | : 12/276830 |
| DATED | : January 22, 2013 |
| INVENTOR(S) | : Kaneda et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this
Thirtieth Day of December, 2014

Michelle K. Lee
*Deputy Director of the United States Patent and Trademark Office*